(12) United States Patent
Vadoothker

(10) Patent No.: US 6,221,255 B1
(45) Date of Patent: Apr. 24, 2001

(54) ULTRASOUND-ASSISTED FILTRATION SYSTEM

(76) Inventor: Achyut R. Vadoothker, 603 Grayfox Sq., Taylors, SC (US) 29687

( * ) Notice: Subject to any disclaimer, the term of this patent is extended or adjusted under 35 U.S.C. 154(b) by 0 days.

(21) Appl. No.: 09/235,611

(22) Filed: Jan. 22, 1999

Related U.S. Application Data

(60) Provisional application No. 60/072,623, filed on Jan. 26, 1998.

(51) Int. Cl.[7] .................................................. B01D 35/20
(52) U.S. Cl. ........................ 210/739; 210/741; 210/748; 210/785; 210/97; 210/103; 210/106; 210/321.69; 210/332; 210/354; 210/407; 210/409; 210/433.1
(58) Field of Search ..................................... 210/739, 741, 210/748, 767, 785, 97, 103, 106, 321.63, 321.69, 332, 354, 355, 406, 407, 409, 413, 416.1, 433.1

(56) References Cited

U.S. PATENT DOCUMENTS

| | | | |
|---|---|---|---|
| 3,068,829 | 12/1962 | Nuissl | 114/222 |
| 3,503,805 | 3/1970 | Denyes | 134/1 |
| 4,158,629 | 6/1979 | Sawyer | 210/137 |
| 4,253,962 | * 3/1981 | Thompson | 210/414 |
| 4,705,054 | 11/1987 | Fields | 134/57 R |
| 4,728,368 | 3/1988 | Pedziwiatr | 134/1 |
| 4,946,602 | 8/1990 | Ekberg | 210/785 |
| 5,038,808 | 8/1991 | Hammond | 134/184 |
| 5,102,534 | * 4/1992 | Gabet | 210/106 |
| 5,151,186 | * 9/1992 | Yoo et al. | 210/541 |
| 5,372,653 | 12/1994 | Gray | 134/26 |
| 5,653,816 | 8/1997 | Ekberg | 134/1 |
| 5,919,376 | * 7/1999 | Carman | 210/785 |

* cited by examiner

*Primary Examiner*—David A. Simmons
*Assistant Examiner*—Betsey Morrison Hoey
(74) *Attorney, Agent, or Firm*—Leatherwood Walker Tood & Mann, P.C.

(57) ABSTRACT

A system wherein an ultrasound emitter, or gun, is provided which emits an ultrasound beam directed at filter media, on the opposite side of the filter media from where solids accumulate, in order to knock the solids from the filter media. Dislodged solids from the area targeted by the beam are driven upstream, away from the filter media. Gravity then draws the solids to a drain of a collection chamber, which allows for the solids to be safely removed from the system. A guide is provided upstream of the filter media, the guide having angled slats or vanes. These vanes are angled upwardly towards the filter media and downwardly towards the drain, such that as the solids are blasted from the filter media by the gun, they are jolted upstream, and impact the angled vanes upon their downstream return.

21 Claims, 9 Drawing Sheets

ULTRASOUND-ASSISTED FILTRATION SYSTEM

This application claims benefit of U.S. Provisional Application Ser. No. 60/072,623, filed Jan. 26, 1998, the entirety of which is incorporated herein by reference thereto.

BACKGROUND OF THE INVENTION

This invention relates generally to a filtration system using ultrasound devices for selectively removing particulate from filter media.

The basic process of filtration is the separation of solids and liquids. Various filtration techniques have been tried in the past, but clogging of filters, can be a problem particularly in industrial applications where flow rates are important for process and production rates. Flow rates can diminish upon clogging of the filter through which the fluid passes. Cross-flow filtration may improve filtration performance in certain applications. Such filtration has already found applications in the dairy industries, fruit and beverage production industries, water purification processes, and in pharmaceutical and biotechnology industries.

Filtration can be substantially enhanced by using ultrasound as noted in *Ultrasound: Its Chemical, Physical and Biological Effects*, edited by S. Suslick, 1988. Impact of ultrasound slows the cake buildup, increases flow rates, reduces barrier cleaning frequency, and delivers drier solids. These experiments used metallic and sandstone barriers with pore sizes from a few microns to over 100 microns. Using a 20 kHz ultrasound frequency, the investigators treated contaminated oil and coal slurries.

Ultrasound is a mechanical form of energy with frequencies above 18 kHz. It can impact solids, liquids, and gasses under appropriate conditions causing either temporary or permanent physical and chemical changes. Sonar systems in ultrasound range have been known since World War I.

Since the 1950s, ultrasound has been well recognized in cleaning applications. The basis for this is the ability of ultrasound to vibrate its target to loosen dirt and solids away from the contact surface. Ultrasound applications today abound in medical diagnostics, process control, soldering, and numerous mechanical biological and chemical areas.

High frequency (500 kHz) ultrasound has been used to bombard aqueous and organic suspensions. This breaks the molecules and generates chemically active radicals which then react with other radicals and molecules. There is a potential to apply ultrasound for toxic chemicals destruction.

In applications where fluids pass through a filtering medium situated substantially perpendicular to the flow of the fluid, the normal filtration process is slowed when the solids it separates from a fluid flow accumulate on the filter media, eventually clogging the filter altogether such that fluid flow therethrough is greatly diminished or altogether prevented. Techniques have been developed which vibrate the filter media for cleaning, and also flow pulsing/reversing techniques have been used which also clean the filter media. Polymers and chemicals have been used to reduce caking of solids on the filter media, and additionally, filter-aids like coagulant additives have been used to increase flow rates.

A problem with flow-through filtration is that typical filter media becomes clogged and requires manual cleaning. Often times this cleaning presents a danger to personnel if the waste stream contains any harmful components. Backwashing, flow pulsing, and filter media vibrations have shown some promise in effectively removing caked-on solids on the filter media, and are available commercially. However, these techniques can involve complicated equipment and may be cost prohibitive. Pressure and vacuum filtration techniques may present similar problems.

While the foregoing systems are known, there still exists a need for apparatus and methods for improving the efficiency of separating solid matter from filter media, and in particular, to perform such separation using automated devices and methods.

SUMMARY OF THE INVENTION

It is, therefore, the principal object of this invention to provide an improved filter cleaning system.

Another object of the present invention is to provide a filter cleaning system using ultrasound cleaning techniques.

Yet another object of the present invention is to provide an ultrasound-assisted filtration system which performs automatically to clean filter media.

Still another object of the present invention is to provide a method of cleaning a filter through use of ultrasound.

The present invention includes an electronic controller that creates a pocket of electrical energy and transmits it to the ultrasound gun. The gun then fires the shot of energy through the fluid towards the filter media. A vibration/disturbance is generated by ultrasound waves fired by the transducer (gun). Based on the fluid viscosity, temperature, and applied electrical energy, the ultrasound disturbance travels towards the filter media at varying rates. This disturbance is what will dislodge the cake on the filter.

The technology is available to deliver the desired magnitude of the force component. As is known in ultrasonic cleaning, the frequency components are useful to dislodge the cake-solids in continuous filtration. The longitudinal components of the force component of this technology can generate motion perpendicular to the filtration barrier media to nudge the solids away.

Generally, the present invention includes a system wherein an ultrasound emitter, or gun, is provided which emits an ultrasound beam. This ultrasound beam is directed at the filter media, on the opposite side of the filter media from where solids accumulate, in order to knock the solids from the filter media. This dislodges the solids from the area targeted by the beam and drives the solids upstream, away from the filter media. Gravity then draws the solids to a drain of a collection chamber, which allows for the solids to be safely removed from the system.

A guide is provided upstream of the filter media, the guide having angled slats or vanes. These vanes are angled upwardly towards the filter media and downwardly towards the drain, such that as the solids are blasted from the filter media by the gun, they are jolted upstream, and impact the angled vanes. The angled vanes direct the solids downwardly out of the fluid flow, such that the solids do not simply re-accumulate on the targeted area of the filter after being blasted therefrom by the ultrasonic beam. The angled vanes of the guide direct the solids downwardly to a solids collection area out of the flow of the fluid where they ultimately pass through the drain.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which.

DESCRIPTION OF THE PREFERRED EMBODIMENT

Figure 1:
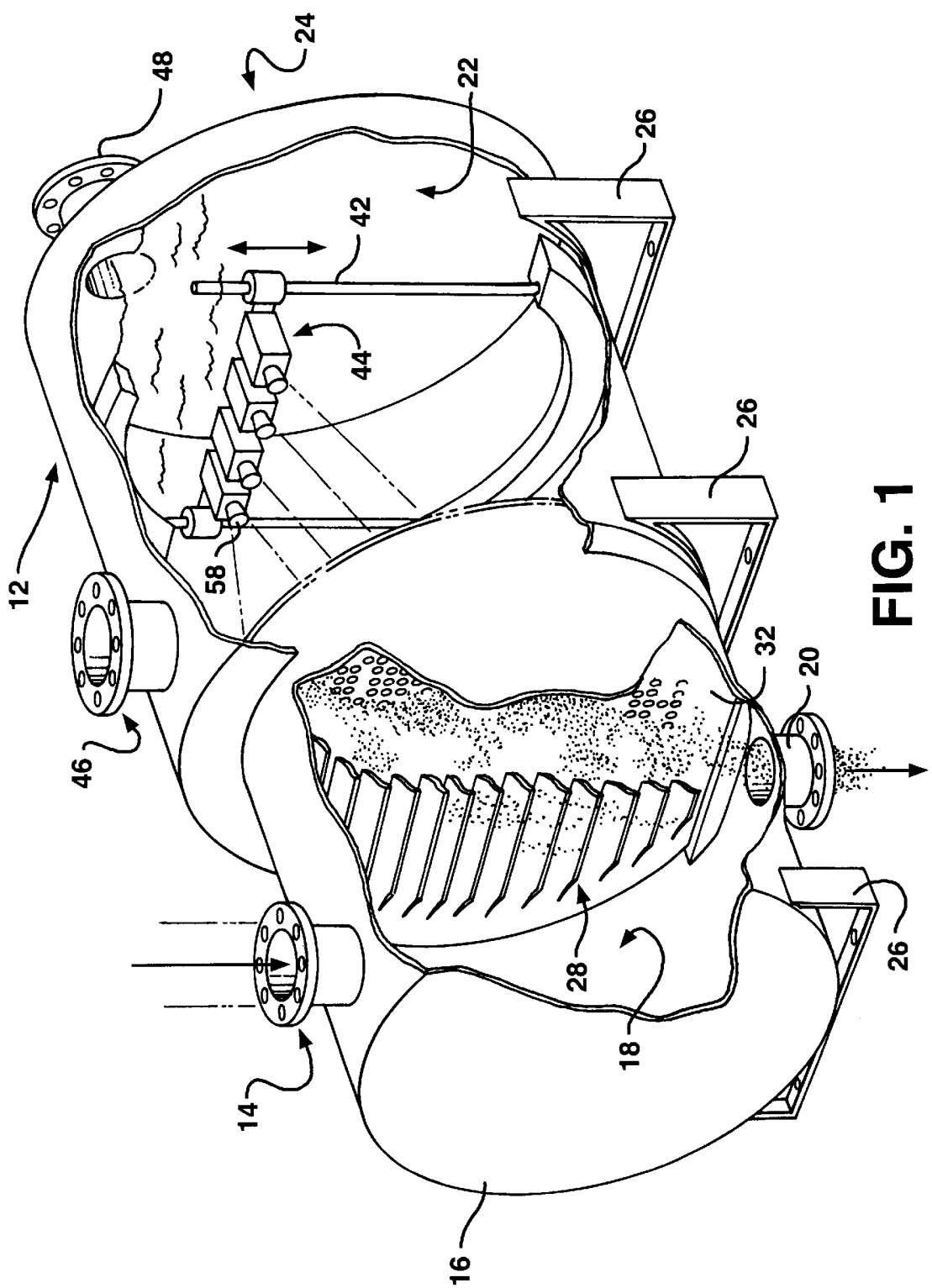
FIG. 1 is a perspective view, with parts cut away, of an ultrasound assisted filtration system constructed in accordance with the present invention.
Figure 2:
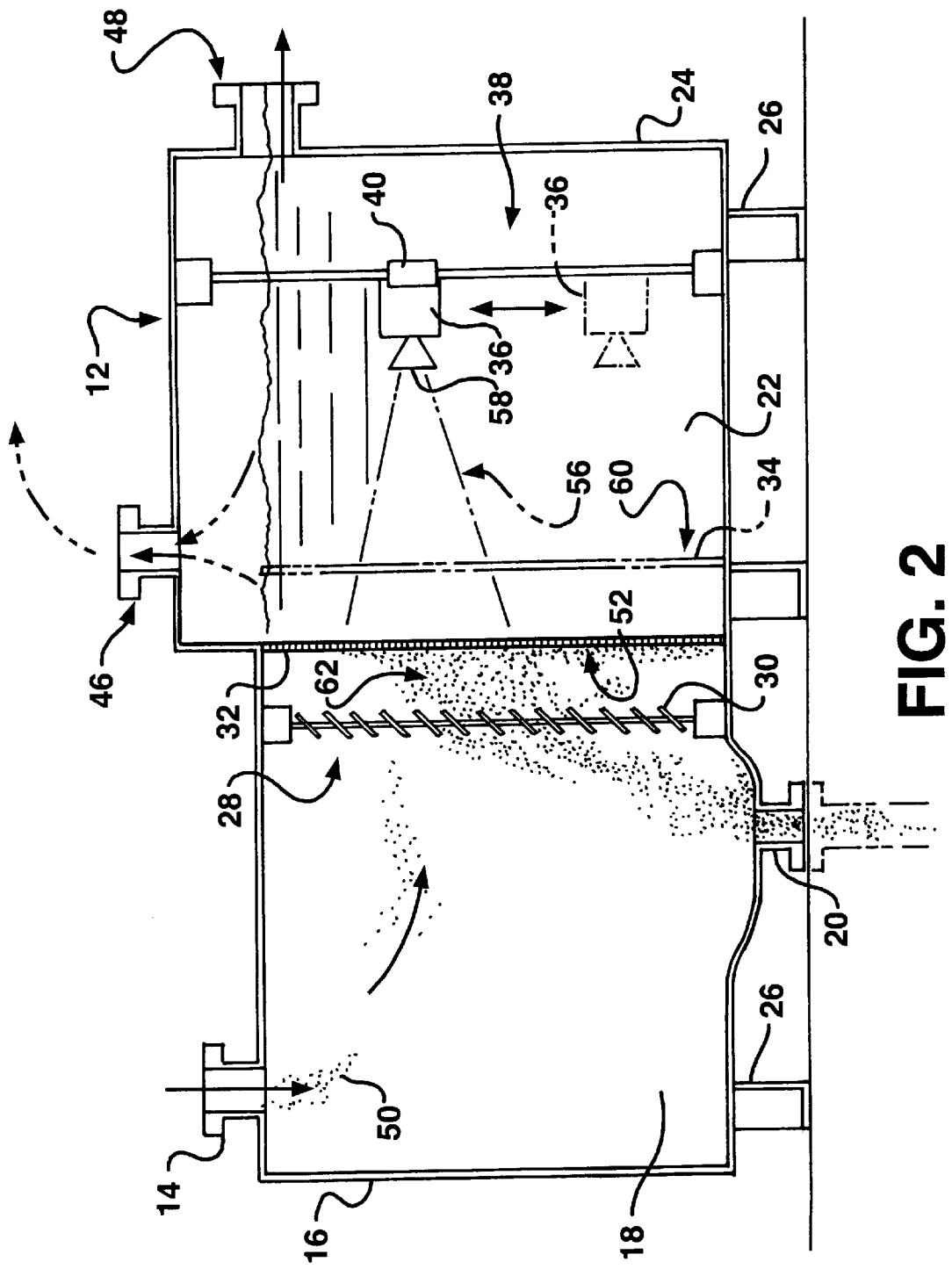
FIG. 2 is a sectional view of an ultrasound assisted filtration system constructed in accordance with the present invention.

The accompanying drawings and the description which follows set forth this invention in its preferred embodiment. However, it is contemplated that persons generally familiar with filtration systems will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the ultrasound filtration system of the present invention is indicated generally in the figures by reference character 10.

The basic components of system 10 will now be addressed, wherein FIG. 1 illustrates one preferred embodiment of the present invention. Although the present invention can assume many different applications and configurations, the filtration tank arrangement, generally 12, illustrated in FIG. 1, includes an inlet, generally 14, through which a slurry mixture is provided into a slurry tank, generally 16. The slurry, which can be raw or chemically conditioned, is provided to slurry tank 16 under pressure, and tank 16 is also preferably pressurized with respect to the ambient environment. Slurry tank 16 includes a slurry compartment, generally 18, to which a drain opening, generally 20, is disposed at the lower portion thereof. The slurry fluid enters through inlet 14 into chamber 18 and is driven towards a filtrate chamber, generally 22, because the pressure within filtrate chamber 22 is generally less than the pressure within slurry chamber 18. Filtrate chamber 22 is carried within a filtrate tank, generally 24, which is connected to and adjacent slurry tank 16. Brackets, generally 26, are provided for supporting tanks 16, 24 from a supporting surface.

While both tanks 16, 24 are illustrated as being cylindrical, it is to be understood that they could be rectangular in shape, or of a variety of other shapes and configurations. For example, although not shown, instead of using the generally cylindrical tank portions 16, 24, a duct having a rectangular, circular, or some other cross-sectional shape, could be used as well, the general principles of the present invention readily lending themselves to a variety of other applications.

In the end of slurry chamber 18 adjacent filtrate chamber 22, a solids guide or grate, generally 28, is provided. Grate 28 is substantially vertically disposed, and is generally perpendicularly positioned with respect to the direction of movement of the slurry mixture from the slurry chamber 18 towards the filtrate chamber 22. Grate 28 includes vanes 30, which are angularly disposed with respect to a filter media member 32 located directly downstream from grate 28. The purpose of the angled vanes 30 will be described in more detail below.

Filter media member 32 is positioned substantially parallel to solids guide 28 and provides an interface between slurry chamber 18 and filtrate chamber 22. Positioned on the other side of filter member 32, opposite that of grate 28, is an attenuation barrier, generally 34, which can be constructed of screen, or some coarse fabric material. Spaced from attenuation barrier 34 is at least one ultrasound transducer, or a gun, 36, or several guns 36 (as illustrated in FIG. 1) which are carried for reciprocating movement on a transducer guide, generally 38. The guns 36 include a collar 40, which rides upon guide 38, which in this embodiment is illustrated as a track, or a rod, 42. Although not shown, guns 36 are reciprocated upwardly and downwardly through use of a motor, hydraulic cylinder, pneumatic cylinder, or some other means for allowing reciprocation. For example, electric motor could be used in connection with a pulley system wherein lines of the pulley would be connected to the guns, or a member connected therewith, for allowing vertical reciprocation of the guns, or bank of guns 44, as illustrated in FIG. 1.

Disposed at the upper portion of filtrate tank 24 is a vacuum outlet, generally 46, through which filtrate may be drawn through use of suction. Disposed perpendicularly from vacuum outlet 46 is an additional filtrate outlet 48 in the end of tank 24 which allows for the flow of filtrate outwardly from tank 24 without the use of a vacuum source.

Now that the basic components of the ultrasound-assisted filtration system 10 of the present invention have been generally set forth, operation of the system will be described. Slurry 50 is pumped into slurry chamber 18 of slurry tank 16 through inlet 14. Because the pressure within slurry chamber 18 is generally higher than that of filtrate chamber 22, the slurry will be forced towards filtrate chamber 22, and accordingly towards the vertically disposed filter media member 32. Initially, if it is assumed that the filter member 32 has never been used, the solids or particulate carried within the slurry 50 will accumulate on side 52 of filter member 32, while the filtrate, i.e., the liquid portion of the slurry now substantially devoid of solids, passes on into filtrate chamber 22. However, after time, the solids from within slurry 50 will accumulate on side 52 of filter member 32 such that passage of filtrate through filter member 32 is greatly diminished, or perhaps ceases altogether. Without more, the filtration value of the system will be minimized or perhaps eliminated altogether.

However, the present invention provides means for automatically removing the accumulated solids from filter member 32 while filter member 32 remains in place. Ultrasound guns 36 provide a controlled beam 56 which emits from horns 58 of transducers 36. This controlled beam blasts the filter media 32, and specifically against side 60 of filter media member 32, such that the solids and particulate clinging to side 52 is knocked off and outwardly from filter media member 32. These knocked-off solids, although blasted upstream by the ultrasound beam 56, will eventually re-accumulate back on side 52 of filter member 32 if not otherwise disposed of. That is the function of grate 28 and angled vanes 30 provided thereon. As the particulate is blasted from side 52 of member 32, it will tend to be pulled downwardly by gravity and will be guided downwardly towards drain 20 by the angled vanes 30. Slurry flow perpendicular to grate 28 will thus not drive the knocked-off particulate, generally 62, back onto filter media member 32.

Attenuation barrier 34 serves to defuse beam 56 such that filter media member 32 is not damaged by the intensity of beam 56 and, accordingly, equalizes the pressure provided by the beam along a predetermined surface area of side 60 of filter media member 32.

The area of side 52 cleaned by beam 56 during a blast from beam 56 will eventually, and perhaps quickly, become re-coated with solids. Therefore, guns 36 are allowed to reciprocate upwardly and downwardly at random or predetermined intervals such that a clean, or relatively clean area of side 52 of filter media 32 is always provided. Mounting guns 36 side by side in bank 44, as illustrated in FIG. 1, allows for a complete swath of the filter media member 32 to be cleared simultaneously. It is to be understood, however, that more or less guns 36 than illustrated in FIG. 1 could be used, if desired.

Also, the gun 36 can cycle up and down 42 only when necessary, for example, when flow through filter media 32 drops below a certain desired velocity, as sensed by a conventional velocity sensor (not shown), or the pressure differential between chambers 18 and 22 fall outside of a preset range, as sensed by a conventional pressure sensor (not shown).

Because the filter media 32 does not have to be removed from tanks 12 to be cleaned, potential risks to workers for being exposed to hazardous chemicals and/or solids can be reduced, in that manual cleaning of filter media member 52 will not generally be required.

Preferably, the ultrasound frequency to be used by guns 36 and beam 56 will be between 18 and 50 kHz.

Figure 3:
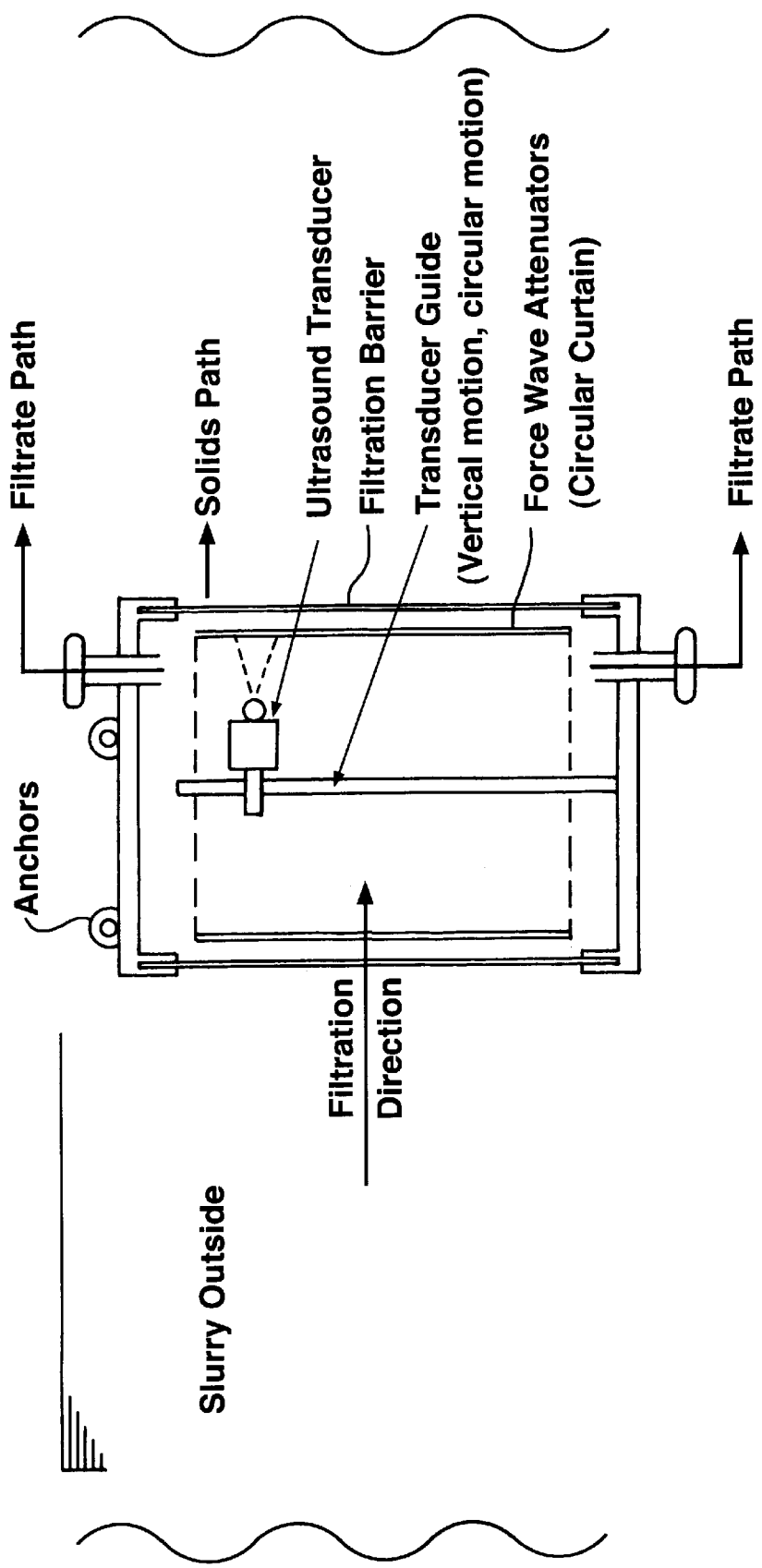
FIG. 3 shows a sectional view of a submerged design (liquid or gas) constructed in accordance with the present invention.
Figure 4:
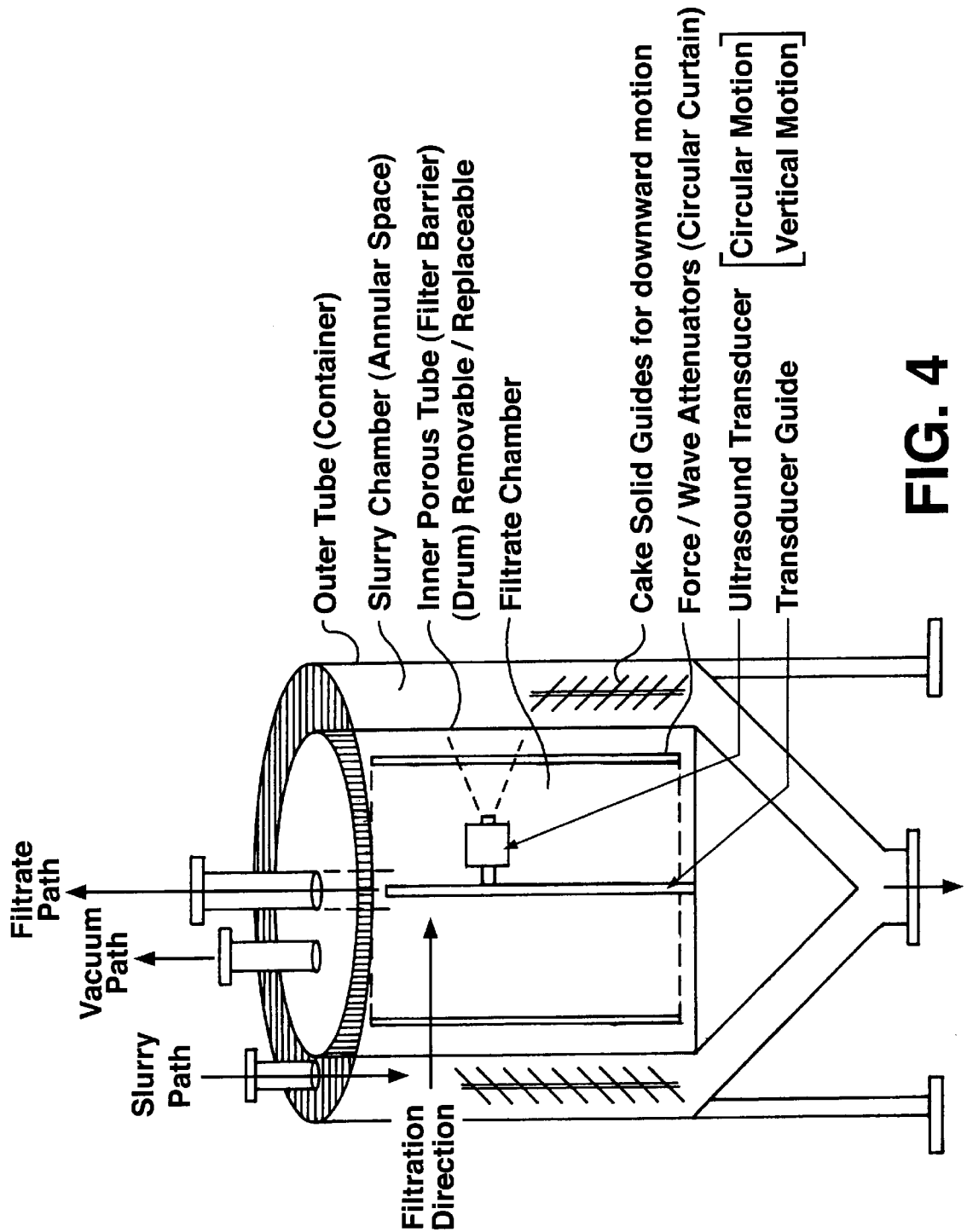
FIG. 4 shows a sectional view of a concentric flow design (liquid or gas) constructed in accordance with the present invention.
Figure 5:
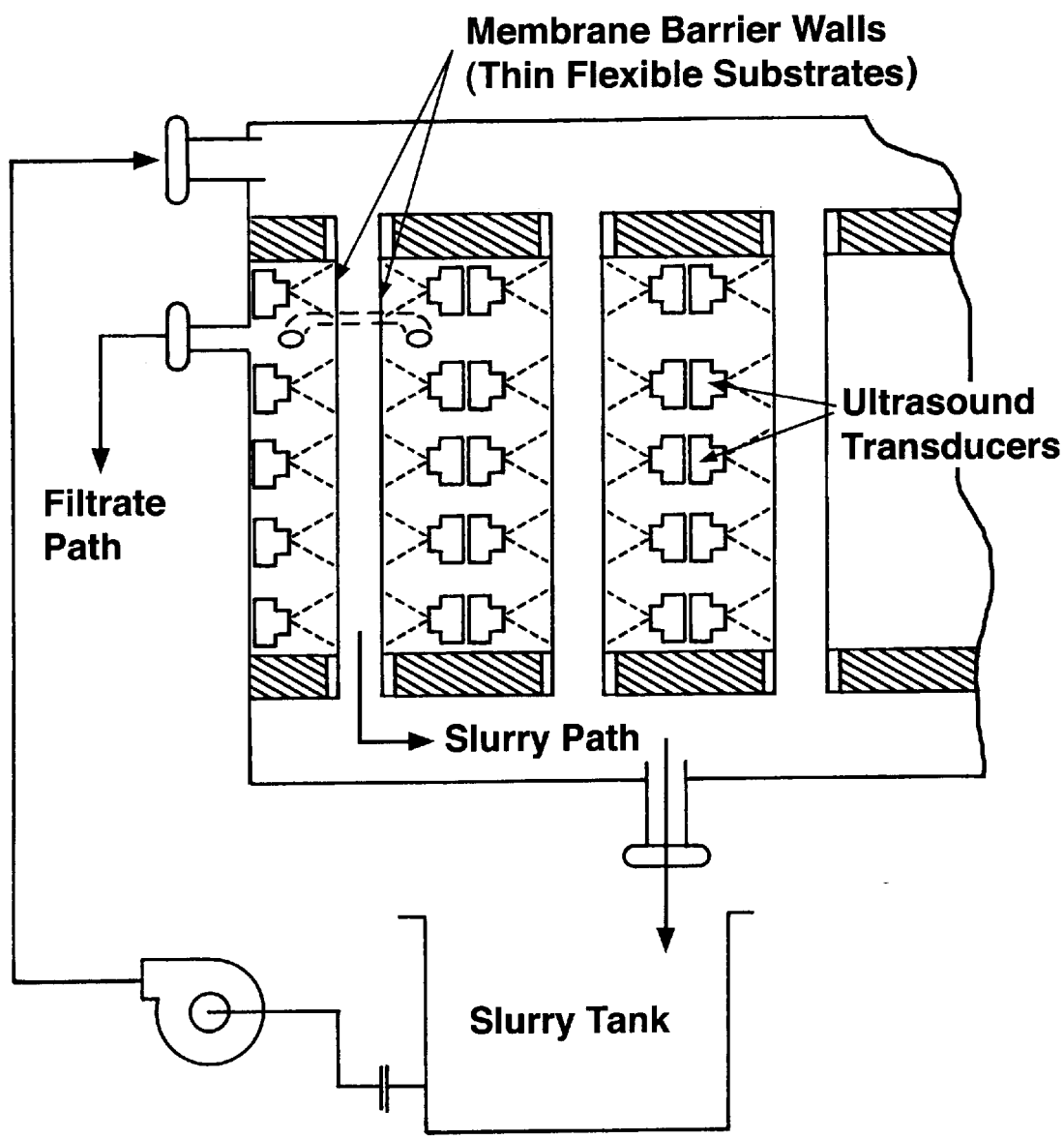
FIG. 5 shows a partial sectional view of a membrane application for use with ultrafiltration, microfiltration, and hyper filtration constructed in accordance with the present invention.
Figure 6:
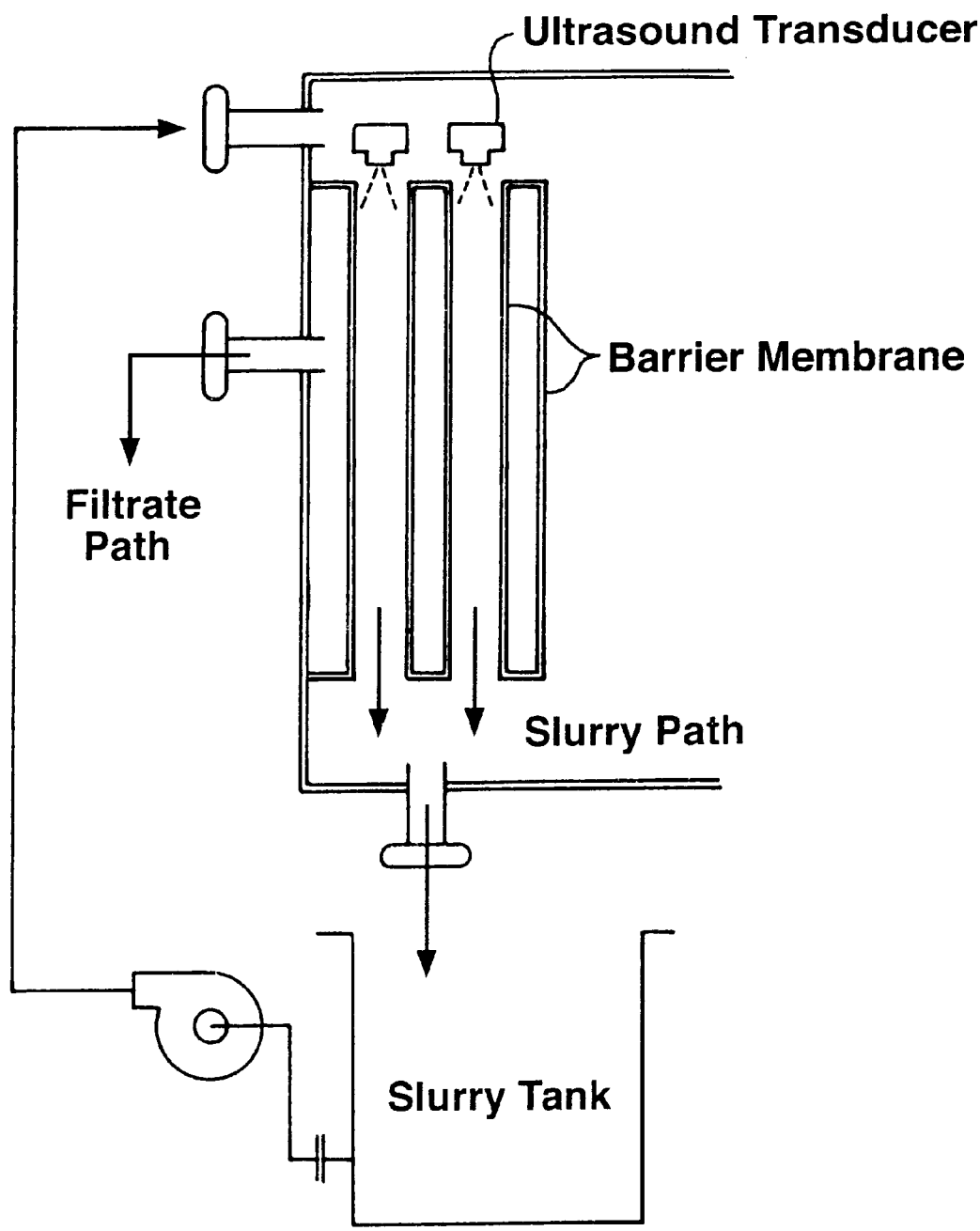
FIG. 6 shows a partial sectional view of a membrane application for use with ultrafiltration, microfiltration, reverse osmosis, organic/inorganic, asymmetric/non-asymmetric membranes constructed in accordance with the present invention.
Figure 7:
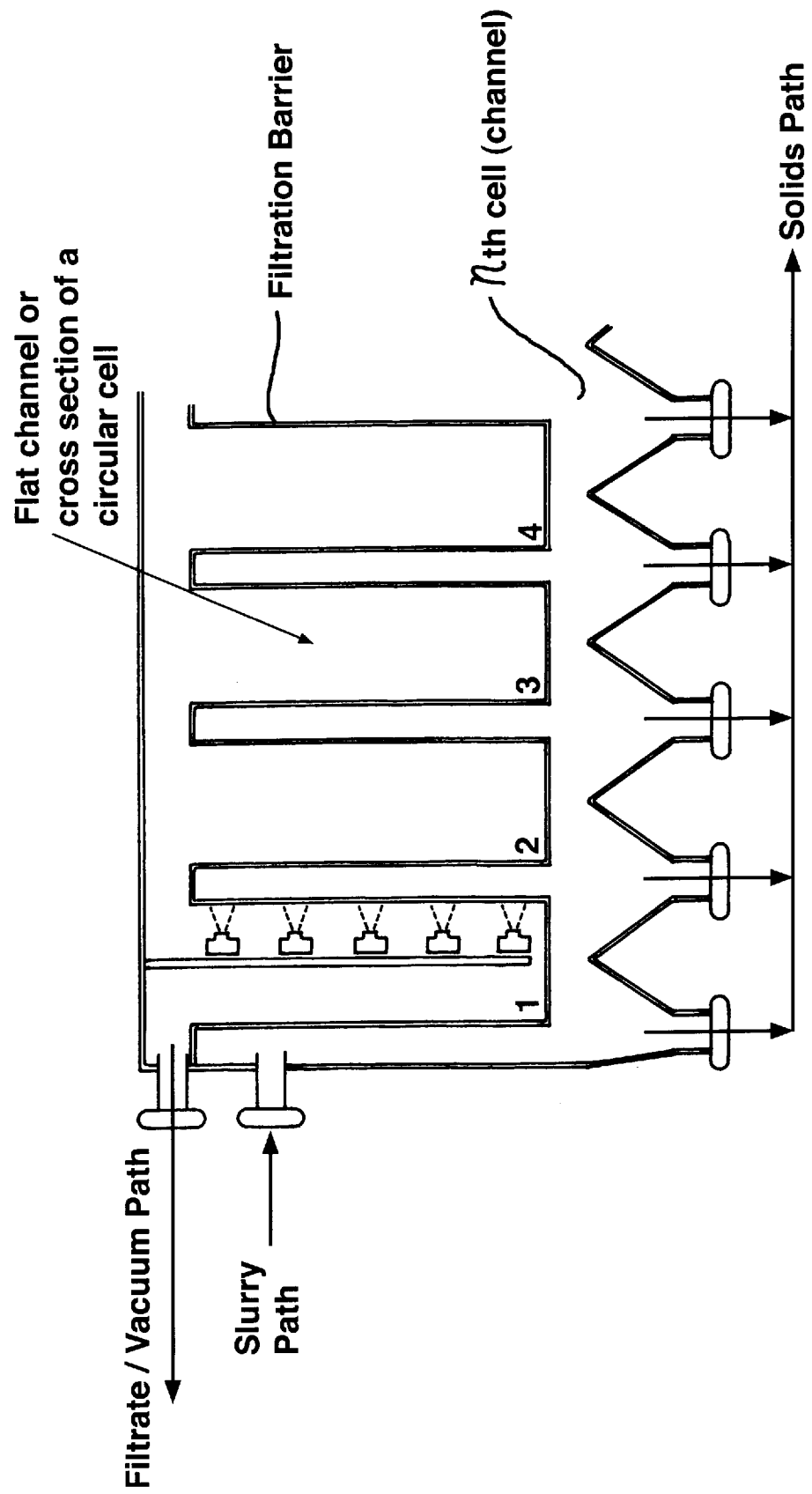
FIG. 7 shows a partial sectional view of a flat channel flow multi-cell design (solid liquid/gas application) constructed in accordance with the present invention.
Figure 8:
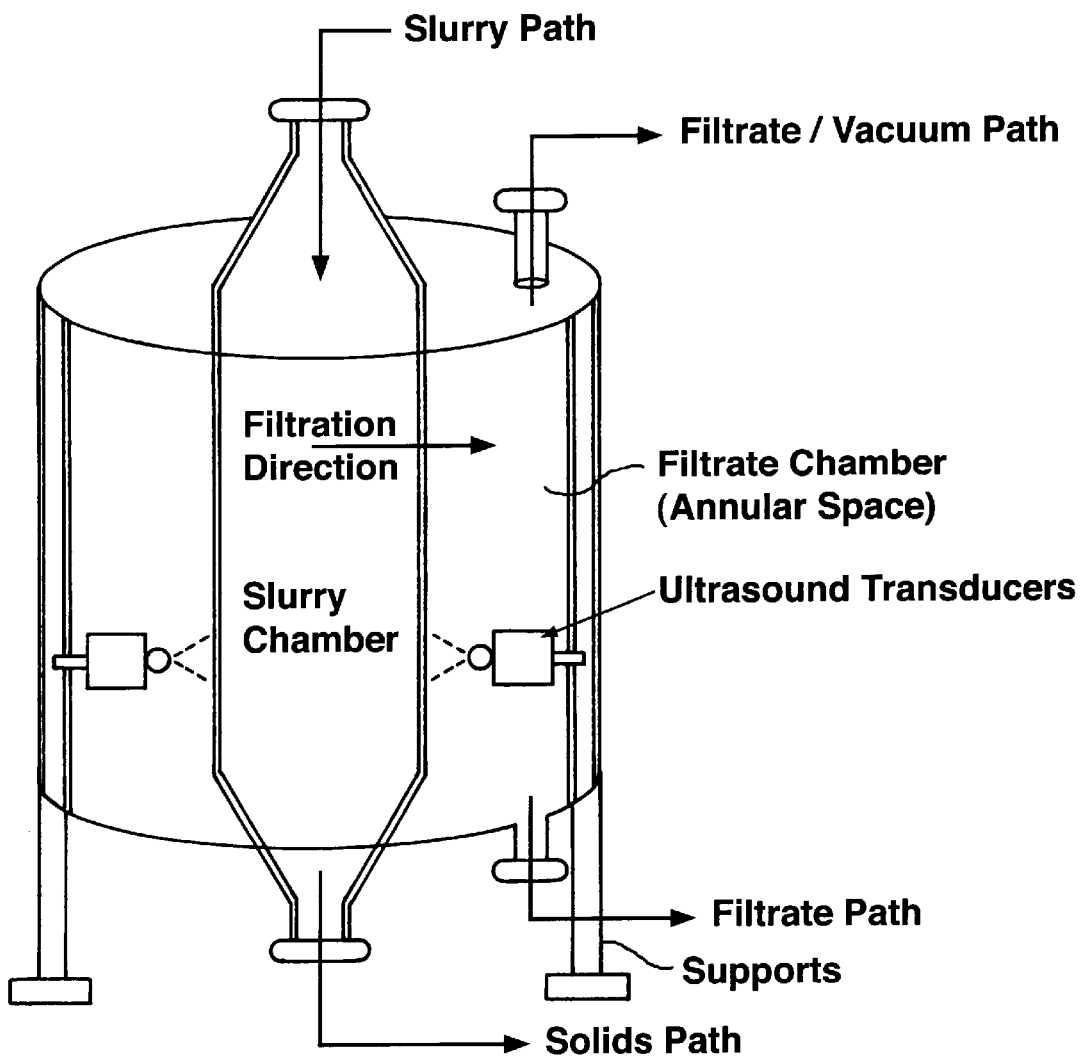
FIG. 8 shows a sectional view of a radial flow design (liquid of gas) constructed in accordance with the present invention.
Figure 9:
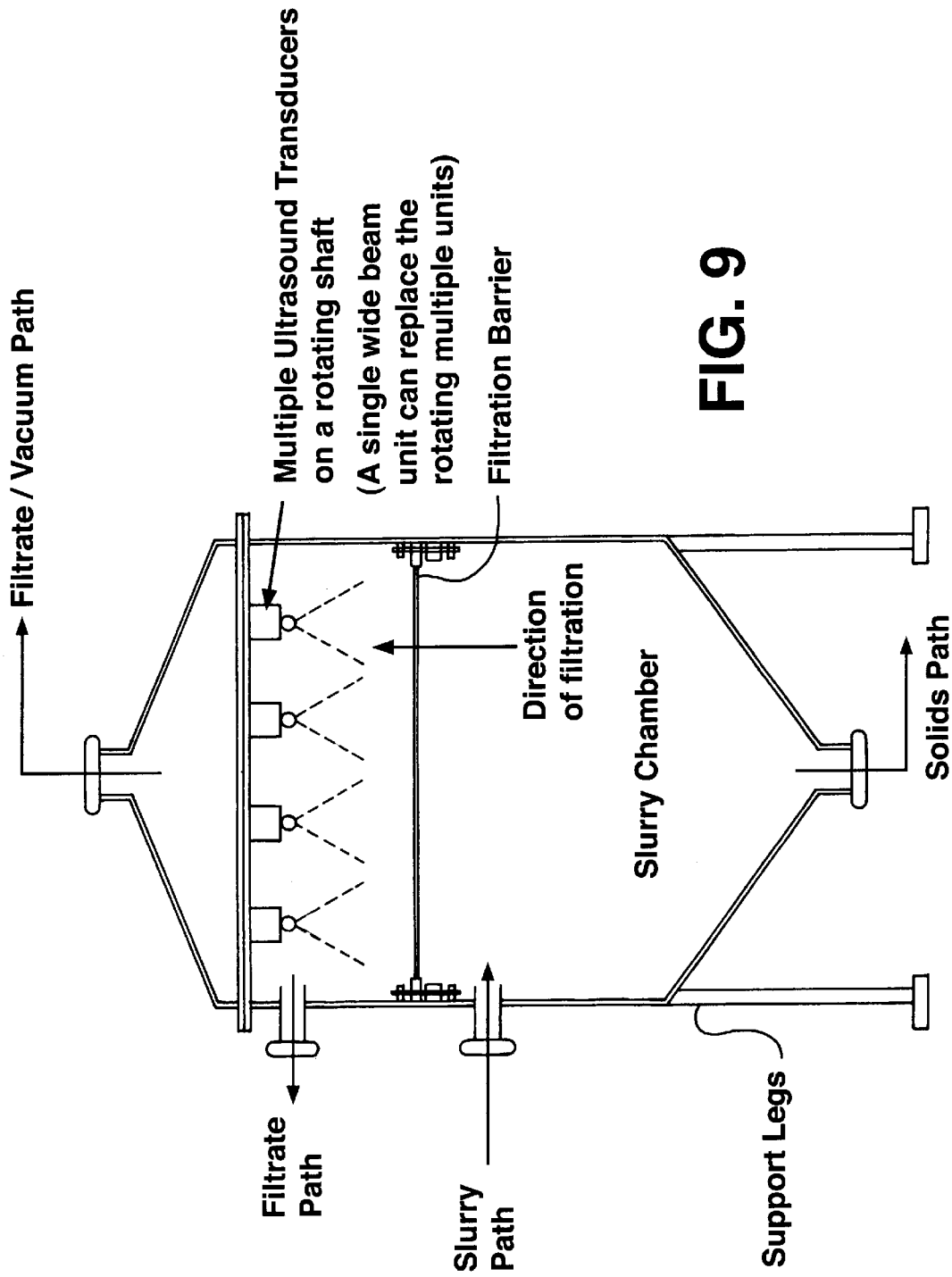
FIG. 9 shows a sectional view of a pressure vessel design with a horizontally disposed filtration barrier constructed in accordance with the present invention.

FIGS. 3 through 9 disclose variations of the present invention contemplated by the disclosure herein, having annotations thereon which are specifically incorporated herein by reference thereto. Specifically, FIG. 3 shows a submerged design (liquid or gas). FIG. 4 shows a concentric flow design (liquid or gas). FIG. 5 shows a membrane application for use with ultrafiltration, microfiltration, and hyper filtration FIG. 6 shows a membrane application for use with ultrafiltration, microfiltration, reverse osmosis, organic/inorganic, asymmetric/non-asymmetric membranes. FIG. 7 shows a flat channel flow multi-cell design (solid liquid/gas application). FIG. 8 shows a radial flow design (liquid of gas) Finally, FIG. 9 shows a pressure vessel design with a horizontally disposed filtration barrier.

More particularly, the embodiment shown in FIG. 3 is for submersion into large tanks, ponds, etc. containing slurry. This submerged design is applicable to any solid-liquid (gas) separation operation with forward pressure of 12 inches fluid to 50 feet fluid, or more (reinforcement of filtrate chamber needed). The vacuum chamber would be in the filtrate path, as shown in FIG. 3, and a circular transducer may also be applicable in the submerged design.

FIG. 4 illustrates a concentric design (liquid or gas), or radial flow design. This design is applicable to any solid-liquid (gas) separation. The radial flow design will be more useful for slurry thickening, and the transducer will be on the outer tube to cover the filtration barrier, shooting concentrically, with system modifications being required. A circular transducer for covering the total circumference of the design can be applied. This would eliminate transducer rotation, and thereby, only vertical motion would be adequate. The outer container tube must be of a pressure vessel design. Also, the filtration direction can be reversed. The FIG. 4 design operation may have under-applied forward pressure, or under-applied vacuum, using a 12 inch to 24 inch fluid head.

FIG. 5 shows a membrane application, for ultra-filtration, micro-filtration, and hyper-filtration. This design is applicable to any solid/liquid/gas seperation. Forward pressure can be zero or greater, as required. The design is a pressure vessel design or full vacuum design.

FIG. 6 illustrates a membrane application for ultra-filtration, micro-filtration, hyper-filtration, reverse osmosis, organic/inorganic, asymmetric/non-asymmetric membranes and is of a tubular/flat channel design. The FIG. 6 design is applicable to any solid/liquid/gas separation, and forward pressure can be zero or greater, as required. The FIG. 6 configuration could be of a pressure vessel design or full vacuum design.

FIG. 7 illustrates a flat channel flow/multicell design for solid/liquid/gas applications. This design is applicable to any solid-liquid or gas separation applications and operates with a forward pressure of zero, or greater, as required. The configuration is a pressure vessel or 100 percent vacuum design. For a circular cell, the transducers travel vertically (stationary units can eliminate motion). For a flat channel design, the transducers travel vertically (stationary units can eliminate motion).

FIG. 8 illustrates a radial flow design (liquid or gas) which is applicable to any solid-liquid or gas separation operation, wherein forward pressure can be zero p.s.i.g. or greater, based on the requirement. Vacuum can be zero to 100 percent (2.29 inches Hg). The design can use a pressure vessel design or a full vacuum design.

FIG. 9 illustrates a liquid or gas application system applicable to any solid-liquid (gas) separation operation. Forward pressure can be zero or greater, based on the requirement. The vessel design can be of pressure vessel design of full vacuum design.

While preferred embodiments of the invention have been described using specific terms, such description is for present illustrative purposes only, and it is to be understood that changes and variations to such embodiments, including but not limitation to the substitution of equivalent features or parts, and the reversal of various features thereof, may be practiced by those of ordinary skill in the art without departing from the spirit or scope of the present disclosure.

What is claimed is:

1. A filtration system for filtering material from a flow of a fluid, the filter system comprising:
a first chamber for receiving fluid, and a second chamber for receiving fluid from said first chamber; said first chamber defining an inlet for receiving fluid therein, and said second chamber defining an outlet for dispensing fluid therefrom;

a filter for receiving flow of the fluid therethrough and disposed between said first and second chambers, said filter having an upstream side adjacent said first chamber and a downstream side adjacent said second chamber; said upstream side of said filter being configured to collect material from the fluid as the fluid flows through said filter; and at least one ultrasonic transducer configured for directing an ultrasonic beam upon said downstream side of said filter of a force sufficient to dislodge and force upstream material collected on said upstream side of said filter.

2. A filtration system as defined in claim 1, further comprising an attenuation barrier positioned between said ultrasonic transducer and said filter.

3. A filtration system as defined in claim 2, wherein said attenuation barrier is constructed of screen.

4. A filtration system as defined in claim 1, further comprising a track for carrying said ultrasonic transducer and herein said ultrasonic transducer is configured for moving on said track.

5. A filtration system as defined in claim 1, further comprising a track for carrying said ultrasonic transducer and wherein said ultrasonic transducer is configured for reciprocating movement on said track.

6. A filtration system as defined in claim 1, further comprising means associated with said ultrasonic transducer for moving said ultrasonic transducer with respect to said filter.

7. A filtration system as defined in claim 1, further comprising said second chamber defining a vacuum outlet for applying a vacuum to fluid in said second chamber.

8. A filtration system as defined in claim 1, further comprising said first chamber defining a drain outlet for receiving material dislodged from said filter.

9. A filtration system as defined in claim 1, further comprising a grate positioned adjacent said upstream side of said filter for downwardly directing material dislodged from said filter.

10. A filtration system as defined in claim 1, further comprising a grate positioned adjacent said upstream side of said filter for downwardly directing material dislodged from said filter, said grate having a plurality of vanes angled upwardly towards said upstream side of said filter.

11. A filtration system as defined in claim 1, wherein said at least one ultrasonic transducer includes a plurality of ultrasonic transducers positioned side-by-side with respect to one another.

12. A filtration system as defined in claim 1, wherein said filter is positioned substantially perpendicular to the direction of flow of the fluid.

13. A method of filtering material from a flow of a fluid, the method comprising:

providing a filter for receiving flow of the fluid therethrough, said filter having an upstream side and a downstream side; said upstream side of said filter being configured to collect material from the fluid as the fluid flows through said filter;

providing at least one ultrasonic transducer configured for directing an ultrasonic beam upon said downstream side of said filter; and directing said ultrasonic beam of said ultrasonic transducer against said downstream side of said filter with a force sufficient to dislodge material which may collect on said upstream side of said filter.

14. The method as defined in claim 13, further comprising:

providing means for sensing a predetermined flow velocity of the fluid through said filter; and upon sensing of said predetermined flow velocity, performing said step of directing said ultrasonic beam of said ultrasonic transducer against said downstream side of said filter with a force sufficient to dislodge and force upstream material which may collect on said upstream side of said filter.

15. The method as defined in claim 13, further comprising:

providing means for sensing a predetermined pressure in the flow of the fluid; and upon sensing of said predetermined pressure, performing said step of directing said ultrasonic beam of said ultrasonic transducer against said downstream side of said filter with a force sufficient to dislodge and force upstream material which may collect on said upstream side of said filter.

16. The method as defined in claim 13, further comprising moving said ultrasonic beam while performing said step of directing said ultrasonic beam of said ultrasonic transducer against said downstream side of said filter with a force sufficient to dislodge and force upstream material which may collect on said upstream side of said filter, such that a major portion of said filter is impacted by said ultrasonic beam.

17. A filtration system for filtering material from a flow of a fluid, the filter system comprising:

a first passage for receiving fluid, and a second passage for receiving fluid from said first passage; said first passage defining an inlet for receiving fluid therein, and said second passage defining an outlet for dispensing fluid therefrom;

a filter for receiving flow of the fluid therethrough and disposed between said first and second passages, said filter having an upstream side adjacent said first passage and a downstream side adjacent said second passage; said upstream side of said filter being configured to collect material from the fluid as the fluid flows through said filter;

at least one ultrasonic transducer configured for directing an ultrasonic beam upon said downstream side of said filter with a force sufficient to dislodge material collected on said upstream side of said filter; and means for moving said ultrasonic transducer with respect to said filter.

18. The filtration system as defined in claim 17, wherein said ultrasonic transducer is configured to deliver said ultrasonic beam upon said downstream side of said filter at a force sufficient to force upstream material dislodged from said upstream side of said filter.

19. The filtration system as defined in claim 17, wherein said filter is constructed of a membrane.

20. The filtration system as defined in claim 17, wherein said filter is constructed of a membrane suitable for reverse osmosis.

21. The filtration system as defined in claim 17, wherein said ultrasonic transducer is configured to direct said ultrasonic beam at said filter in a direction generally perpendicular to the direction of flow of the fluid.

\* \* \* \* \*

UNITED STATES PATENT AND TRADEMARK OFFICE
CERTIFICATE OF CORRECTION

PATENT NO. : 6,221,255 B1
DATED : April 24, 2001
INVENTOR(S) : Achyut R. Vadoothker It is certified that error appears in the above-identified patent and that said Letters Patent is hereby corrected as shown below:

Column 6,
Line 5, insert -- flow -- before "design"
Line 45, change "2.29" to -- 29.9 --
Line 51, change "of" to -- or --
Line 56, change "limitation" to -- limited --

Column 7,
Line 19, change "herein" to -- wherein --

Signed and Sealed this

Twenty-seventh Day of November, 2001

Attest:

NICHOLAS P. GODICI
Attesting Officer    Acting Director of the United States Patent and Trademark Office